United States Patent
Hayasaka et al.

(10) Patent No.: US 8,121,348 B2
(45) Date of Patent: Feb. 21, 2012

(54) OBJECT DETECTION APPARATUS, METHOD AND PROGRAM

(75) Inventors: Shoichi Hayasaka, Susono (JP); Hideo Fukamachi, Susono (JP); Yoshimasa Hara, Nagoya (JP); Naotaka Ichikawa, Chita-gun (JP); Toshio Sawaki, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 668 days.

(21) Appl. No.: 12/308,582

(22) PCT Filed: Jul. 9, 2007

(86) PCT No.: PCT/IB2007/001906
§ 371 (c)(1),
(2), (4) Date: Dec. 18, 2008

(87) PCT Pub. No.: WO2008/007197
PCT Pub. Date: Jan. 17, 2008

(65) Prior Publication Data
US 2010/0226532 A1    Sep. 9, 2010

(30) Foreign Application Priority Data
Jul. 10, 2006   (JP) ................................. 2006-189650

(51) Int. Cl.
*G06K 9/00* (2006.01)
(52) U.S. Cl. .................. 382/103; 701/200; 348/148
(58) Field of Classification Search .................. 382/100, 382/103, 104, 106, 107, 181, 190, 191, 192, 382/195, 168, 170, 171; 348/135, 143, 148; 701/1, 23, 200, 300, 301
See application file for complete search history.

(56) References Cited

U.S. PATENT DOCUMENTS

| | | | | |
|---|---|---|---|---|
| 7,356,408 | B2 * | 4/2008 | Tsuchiya et al. | 701/211 |
| 7,466,841 | B2 * | 12/2008 | Bahlmann et al. | 382/103 |
| 7,639,840 | B2 * | 12/2009 | Hanna et al. | 382/103 |
| 7,920,721 | B2 * | 4/2011 | Unoura | 382/104 |
| 2006/0177131 | A1 * | 8/2006 | Porikli | 382/168 |
| 2007/0047809 | A1 * | 3/2007 | Sasaki | 382/170 |
| 2011/0043624 | A1 * | 2/2011 | Haug | 348/135 |
| 2011/0081049 | A1 * | 4/2011 | Walter et al. | 382/106 |

FOREIGN PATENT DOCUMENTS

| | | |
|---|---|---|
| EP | 0 807 914 A1 | 11/1997 |
| EP | 1 363 243 A1 | 11/2003 |
| EP | 1 674 883 A2 | 6/2006 |
| JP | A-2004-192080 | 7/2004 |

OTHER PUBLICATIONS

Viola et al, "Rapid Object Detection Using a Boosted Cascade of Simple Features," Accepted Conference on Computer Vision and Pattern Recognition, 2001, pp. 1-9.

* cited by examiner

*Primary Examiner* — Anand Bhatnagar
(74) *Attorney, Agent, or Firm* — Oliff & Berridge, PLC

(57) ABSTRACT

An object detection apparatus for detecting an object from an image obtained by taking a front view picture of a road in a traveling direction of a vehicle includes a camera unit for taking the front view picture of the road and inputting the image; a dictionary modeling the object; a search unit for searching the image with a search window; a histogram production unit for producing a histogram by comparing the image in the search window with the dictionary and counting a detection frequency in a direction parallel to a road plane; and a detection unit for detecting the detection object by detecting a unimodal distribution from the histogram.

13 Claims, 22 Drawing Sheets

FIG.5

| | DICTIONARY COMPLEXITY N | MAXIMUM SEARCH PIXEL SKIPPING AMOUNT (NORMALIZED TO REFERENCE WINDOW SIZE) | MAXIMUM CHANGING AMOUNT OF SEARCH WINDOW W |
|---|---|---|---|
| SIMPLE | 1 | OUT OF NORMAL DISTRIBUTION | – |
| ↑ | 2 | OUT OF NORMAL DISTRIBUTION | – |
| | 3 | OUT OF NORMAL DISTRIBUTION | – |
| | 4 | OUT OF NORMAL DISTRIBUTION | – |
| | 5 | 5 PIXELS | 2 |
| | 6 | 4 PIXELS | |
| | 7 | 4 PIXELS | |
| | 8 | 4 PIXELS | |
| | 9 | 4 PIXELS | |
| | 10 | 4 PIXELS | |
| | 11 | 4 PIXELS | |
| | 12 | 4 PIXELS | |
| | 13 | 3 PIXELS | |
| | 14 | 3 PIXELS | |
| | 15 | 3 PIXELS | |
| | 16 | 2 PIXELS | |
| | 17 | 2 PIXELS | |
| | 18 | 2 PIXELS | |
| ↓ | 19 | 2 PIXELS | |
| COMPLEX | 20 | 2 PIXELS | |

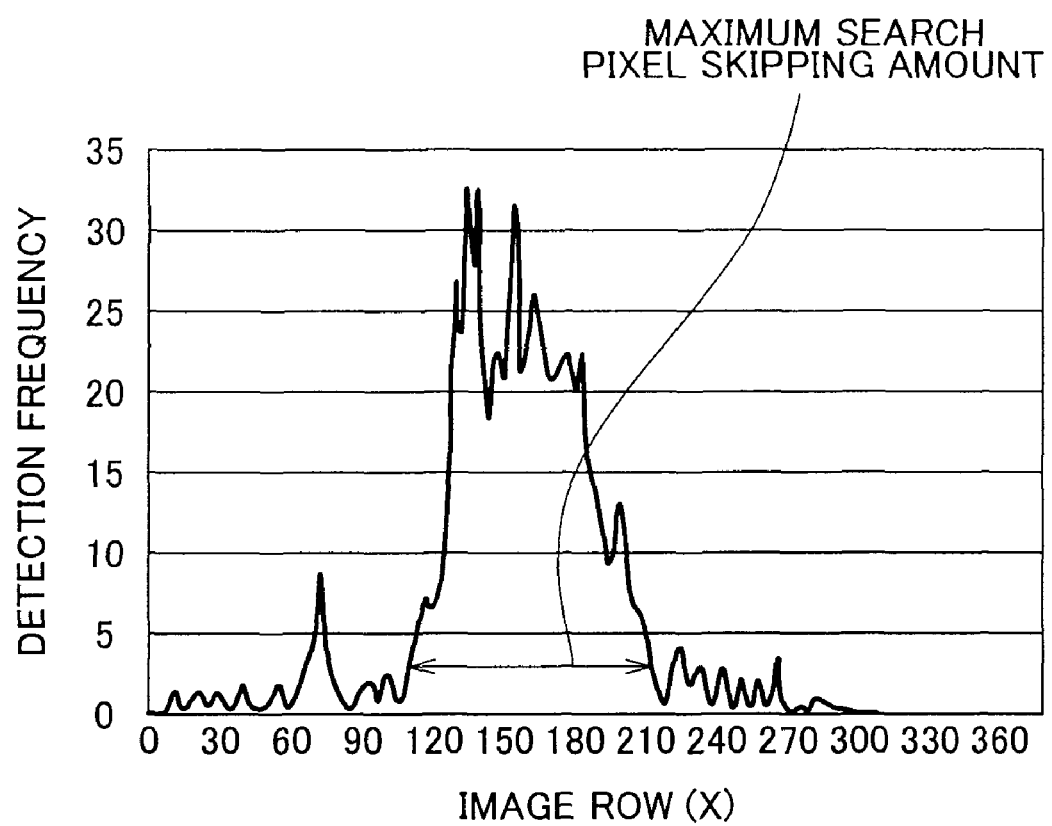

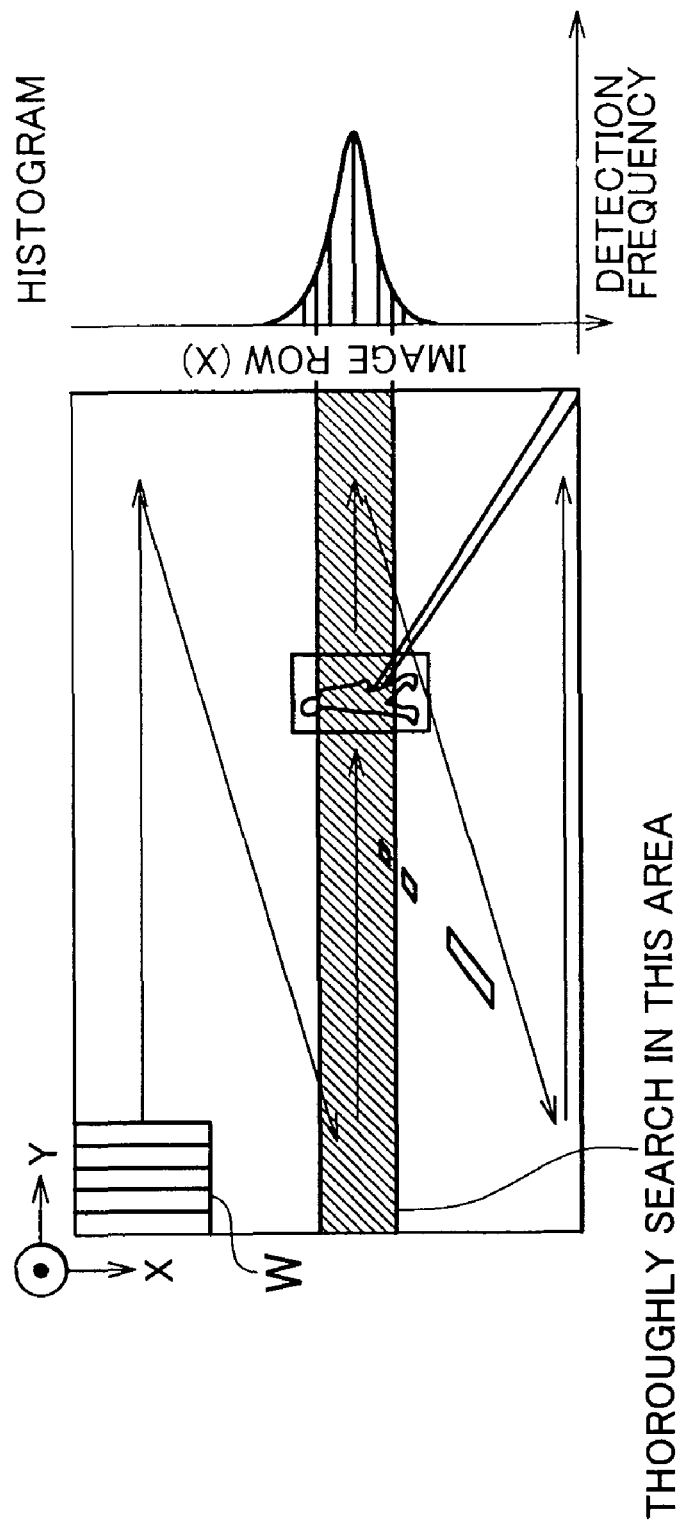

OBJECT DETECTION APPARATUS, METHOD AND PROGRAM

BACKGROUND OF THE INVENTION

1. Field of the Invention

The present invention relates to an object detection apparatus, an object detecting method and a program for object detection; and more particularly, to an object detection apparatus, an object detecting method and an object detection program, for use in detecting an object from an image of the road in a traveling direction of a vehicle.

2. Description of the Related Art

In general, an object detection apparatus typically obtains and processes an image of an object in the front of a vehicle in a traveling direction thereof, while the vehicle being driven, by a camera unit mounted on the vehicle, and based on the result of the image processed, the apparatus classifies the object in the front of the vehicle as a vehicle, a pedestrian, or a road structure.

For example, in Japanese Patent Application Publication No. 2004-192080 (JP 2004-192080 A), a frame image before the vehicle is obtained by a CCD camera, and an object candidate area which may include an image of a leading vehicle traveling and the like are extracted from the image. A cutout plane is successively moved along Z-axis, which is the vehicle traveling direction to derive the overlapping area of the cutout plane with the object candidate area. A matching distance is calculated on the basis of the overlapping area and each reference image stored in a memory. The position in Z-axis of the cutout plane where the matching distance is minimum is determined, and the Z-axial position at that time is set as the optimum position for cutout. By comparing the object candidate area cut out in the optimum position with each reference image, the object candidate is determined as a vehicle or not depending on whether or not the matching distance is minimum.

However, in JP 2004-192080 A, because an object is detected based on a histogram produced on edge extraction frequencies of the frame image with respect to both horizontal and vertical directions, the calculation time required for detecting the object is prolonged, thereby restraining the object detection from being performed rapidly.

An object detection method using a classifier is described, in "Paul Viola and Michael J. Jones, Rapid Object Detection using a Boosted Cascade of Simple Features, IEEE CVPR (2001)" (Viola et al.). The classifier (referred to as "cascade of boosted classifiers" with Haar-like features characterized by luminance differences of rectangles) learns several hundreds images (having a specific size) of specific objects such as vehicles, faces and the like, wherein the images are defined as positive samples, and then learns arbitrary images having the same size, wherein the images are referred to as negative samples. After the end of the learning process conducted by the classifiers, an image is searched in a search window and is applied, as an ROI (Region of Interest) which is a partial image having the same size as that of the learned samples. A digit "1" is given if the partial image is approximated as a vehicle or a face. Otherwise a digit "0" is given. The classifiers (hereinafter often referred to as "dictionaries") include a plurality of stages. Each time the stages advance, the classifier becomes more complex, thereby increasing the detection rate of a particular object and decreasing a false positive rate thereof.

However, in Viola et al., (1) no index for examining a search pixel skipping amount is described; (2) no index for determining the amount of change in the search window is described; (3) uncertainty in the position in which the detection object exists makes it impossible to define a search region; and (4) there is no complexity index of the dictionary required for detecting the detection object. For these reasons, Viola et el. suffers from problems such as: (1) time-consuming detection of objects; (2) inability to specify an object size in the image; and (3) a false detection is likely to occur.

SUMMARY OF THE INVENTION

The present invention provides an object detection apparatus, an object detecting method and an object detection program that reduces the calculation load to detect an object more quickly.

In accordance with a first aspect of the present invention, there is provided an object detection apparatus for detecting an object from an image obtained by taking a picture of the road before a vehicle in the direction of travel, the object detection apparatus including a camera unit for taking the picture of the road and inputting the image; a dictionary modeling the object; and a search unit for searching the image with a search window. In addition, the object detection apparatus includes a histogram production unit for producing a histogram by comparing the image in the search window with the dictionary and counting a detection frequency in a direction parallel to a road plane; and a detection unit for detecting the object by detecting a unimodal distribution from the histogram.

In addition, the object detection apparatus may further include a determination unit for determining erroneous detection if the histogram is of a multimodal distribution.

Further, the search unit may be adapted to search the image while the size of the search window is changed and the histogram production unit may be adapted to produce the histogram for each size of the search window. In addition, the object detection apparatus may further include an object size estimation unit to estimate the size of the object based on a maximum detection frequency in the histogram for each size of the search window produced by the histogram production unit.

Further, the dictionary may have a resolution determined by searching a plurality of sample images containing the object with the search window, by comparing the sample images in the search window with a plurality of dictionaries of different resolutions, and by counting a detection frequency in a direction parallel to a road plane to thereby produce histograms on a dictionary-by-dictionary basis. Further, the resolution of the dictionary may be determined by determining lowest resolutions among resolutions of the dictionaries that allow the histograms to have a unimodal distribution, and averaging the lowest resolutions derived with respect to the plurality of sample images.

Further, the search unit may be adapted to search the image with the search window in a predetermined pixel skipping amount, the predetermined pixel skipping amount being determined by searching a plurality of sample images containing the object with the search window, comparing the sample images in the search window with the dictionary, and counting a detection frequency in a direction parallel to a road plane to thereby produce histograms. In addition, the predetermined pixel skipping amount may also be determined by calculating maximum pixel skipping amounts in a direction perpendicular to a road plane based on a shape of the histograms, and averaging the maximum pixel skipping amounts derived for the plurality of sample images to obtain an average maximum pixel skipping value which serves as an upper limit of the predetermined pixel skipping amount.

Further, the search unit may be adapted to search the image in a predetermined search window size changing amount, the predetermined search window size changing amount being determined by searching a plurality of sample images containing the object while a size of the search window is changed, comparing the sample images in the search window with the dictionary, and counting a detection frequency in a direction parallel to a road plane to thereby produce histograms. In addition, the predetermined search window size changing amount may also be determined by calculating maximum search window size changing amount based on a maximum detection frequency in the histograms for each search window size, and averaging the maximum search window size changing amounts derived for the plurality of sample images to obtain an average maximum search window size changing value that serves as an upper limit of the predetermined search window size changing amount.

In accordance with a second aspect of the present invention, there is provided an object detecting method for detecting a object from an acquired image of the road before a vehicle in the direction of travel. The object detecting method of the second aspect includes an image acquiring step of taking a picture of the road before the vehicle and inputting the image; and a search step of searching the image with a search window. In addition, the object detecting method of the second aspect further includes a histogram production step of producing a histogram by comparing the image in the search window with a dictionary modeling the object and counting a detection frequency in a direction parallel to a road plane; and a detection step of detecting the object by detecting a unimodal distribution from the histogram.

In accordance with a third aspect of the present invention, there is provided a program for detecting an object from an image acquired by taking a picture of the road in a traveling direction of a vehicle, the program allowing a computer to function as a search unit for searching the acquired image with a search window; a histogram production unit for producing a histogram by comparing the image in the search window with a dictionary modeling the object and counting a detection frequency in a direction parallel to a road plane; and a detection unit 22 for detecting the object by detecting a unimodal distribution from the histogram.

The present invention provides an object detection apparatus the detects an object from an image obtained by taking a picture of the road before the vehicle in the direction of travel, which can be used for detecting an object with a reduced calculation load and at an increased speed. This is obtained by having the object detection apparatus which includes a camera unit for taking the picture of the road before the vehicle and inputting an image, a search unit for searching the image with a search window, a histogram production unit for producing a histogram by comparing the image in the search window with a dictionary modeling the object and counting the detection frequency in a direction parallel to a road plane, and a detection unit for detecting an object by detecting a unimodal distribution from the histogram thus produced.

BRIEF DESCRIPTION OF THE DRAWINGS

The above and other objects and features of the present invention will become apparent from the following description of example embodiments given in conjunction with the accompanying drawings, in which:

FIG. 5 is a view illustrating one example of a table produced for every sample image in case of performing a parameter determination process;

FIG. 7B is a view for explaining a maximum search pixel skipping amount;

FIG. 11A is a view for explaining a search region confining process;

DETAILED DESCRIPTION OF EXAMPLE EMBODIMENTS

Hereinafter, an object detection apparatus, an object detecting method and a program for object detection in accordance with the present invention will be described with reference to the drawings. It should be appreciated that the present invention is not limited to the illustrated embodiment. It should also be understood that elements of the embodiment described below include other elements which can be easily conceivable by an ordinary skilled person or elements which are substantially the same as those disclosed herein.

Figure 1:
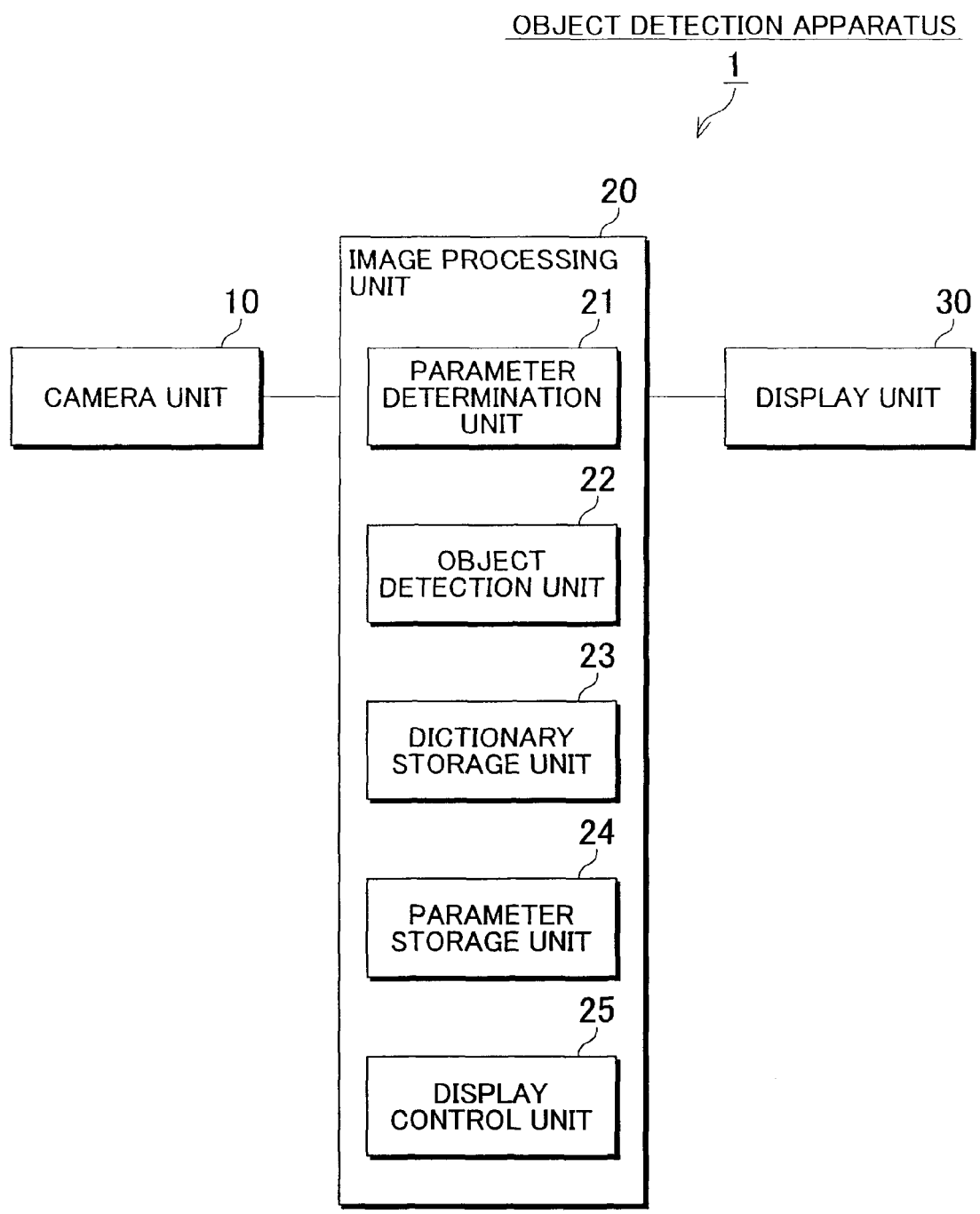
FIG. 1 is a view showing a function-based configuration of an object detection apparatus in accordance with an embodiment of the present invention.

The present embodiment will be described based on an example case in which a pedestrian is detected by an object detection apparatus mounted on a vehicle. The object detection apparatus in accordance with the present embodiment may find its application in a night view apparatus or the like. FIG. 1 is a view showing a function-based configuration of the object detection apparatus in accordance with an embodiment of the present invention.

As shown in FIG. 1, the object detection apparatus 1 includes a camera unit 10 that takes a picture of an object and acquires a detection image, an image processing unit 20 for detecting a pedestrian based on the detection image taken by the camera unit 10 and a display unit 30 for displaying the image taken by the camera unit 10.

The camera unit 10 may be, for example, a near infrared camera (with a wavelength of 780 nm to 1500 nm) and is configured to take the picture of the road before a vehicle in the direction of travel (front road view) and outputs a gray-scale image of the picture thus taken to the image processing unit 20.

The image processing unit 20 includes a parameter determination unit 21, an object detection unit 22, a dictionary storage unit 23, a parameter storage unit 24 and a display controller 25. The parameter determination unit 21 executes a parameter determination process, described below (see FIG. 2), to calculate parameters, which in turn are stored in the parameter storage unit 24.

By using the parameters stored in the parameter storage unit 24, the object detection unit 22 executes an object detection process (see FIGS. 9A and 9B) (to be described later) to detect the pedestrian from the image. The dictionary storage unit 23 stores dictionaries of different complexities (resolutions) produced by modeling pedestrians. Specifically, the dictionary storage unit 23 stores dictionaries (a classifier) of up to N stages (e.g., N=20) obtained through the preliminary learning on pedestrians, as described in Viola et al., previously described. The dictionaries become more complex each time the stages advance, thereby decreasing a detection rate of an object and increasing a false positive rate thereof. The dictionaries stored in the dictionary storage unit 23 are used in the parameter determination process and the object detection process. Because a detailed method of producing the dictionaries is described in Viola et al., the details thereof will be omitted herein.

The parameter storage unit 24 stores parameters calculated by the parameter determination process. The parameters stored in the parameter storage unit 24 are used in the object detection process. The display controller 25 controls a display unit 30 to display the image taken by the camera unit 10 on the display unit 30.

The display unit 30 includes a head-up display and the like while displaying the image taken by the camera unit 10. Furthermore, the display unit 30 displays the pedestrian included in the image after classification.

Figure 2:
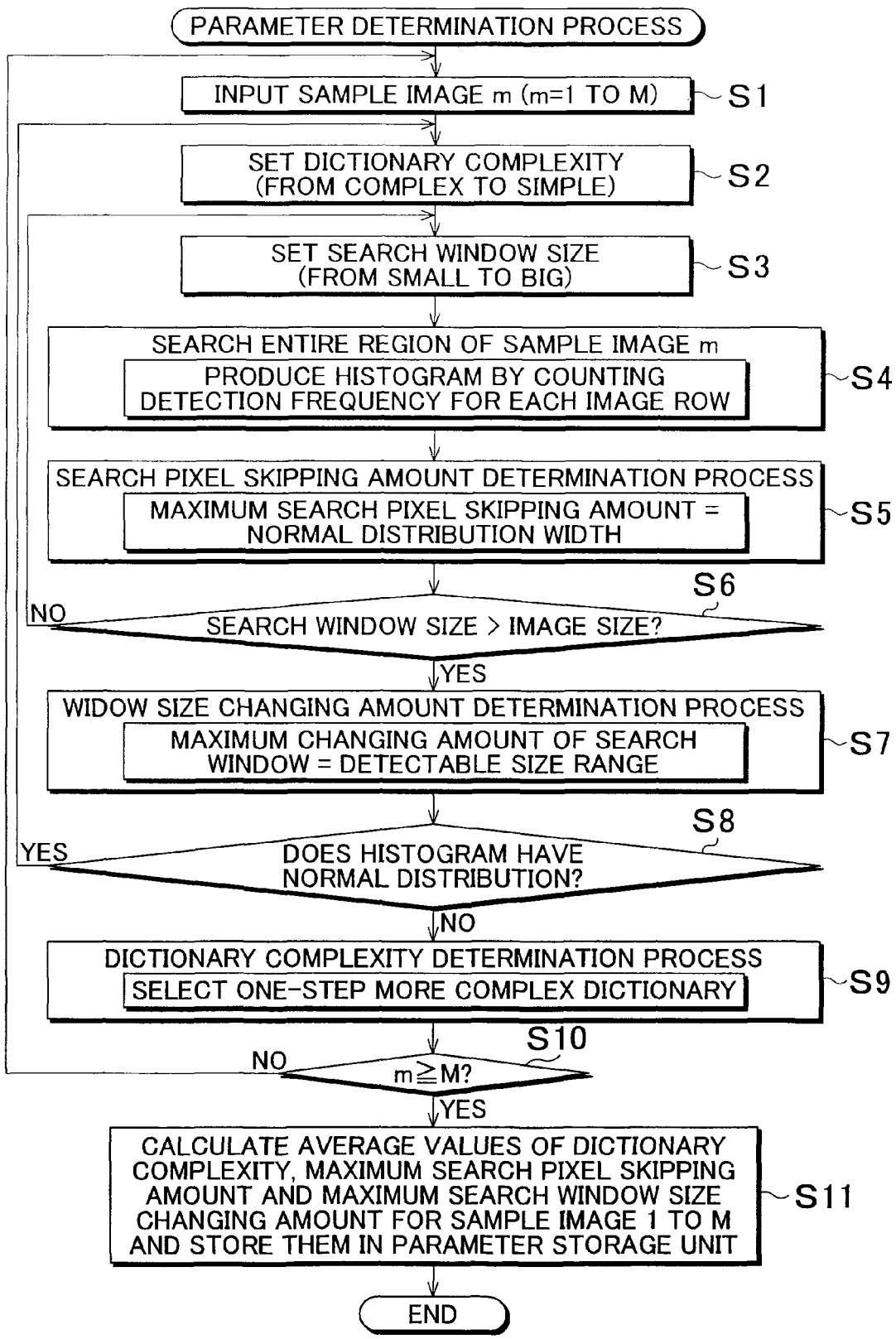
FIG. 2 is a flowchart for explaining a parameter determination process.
Figure 3:
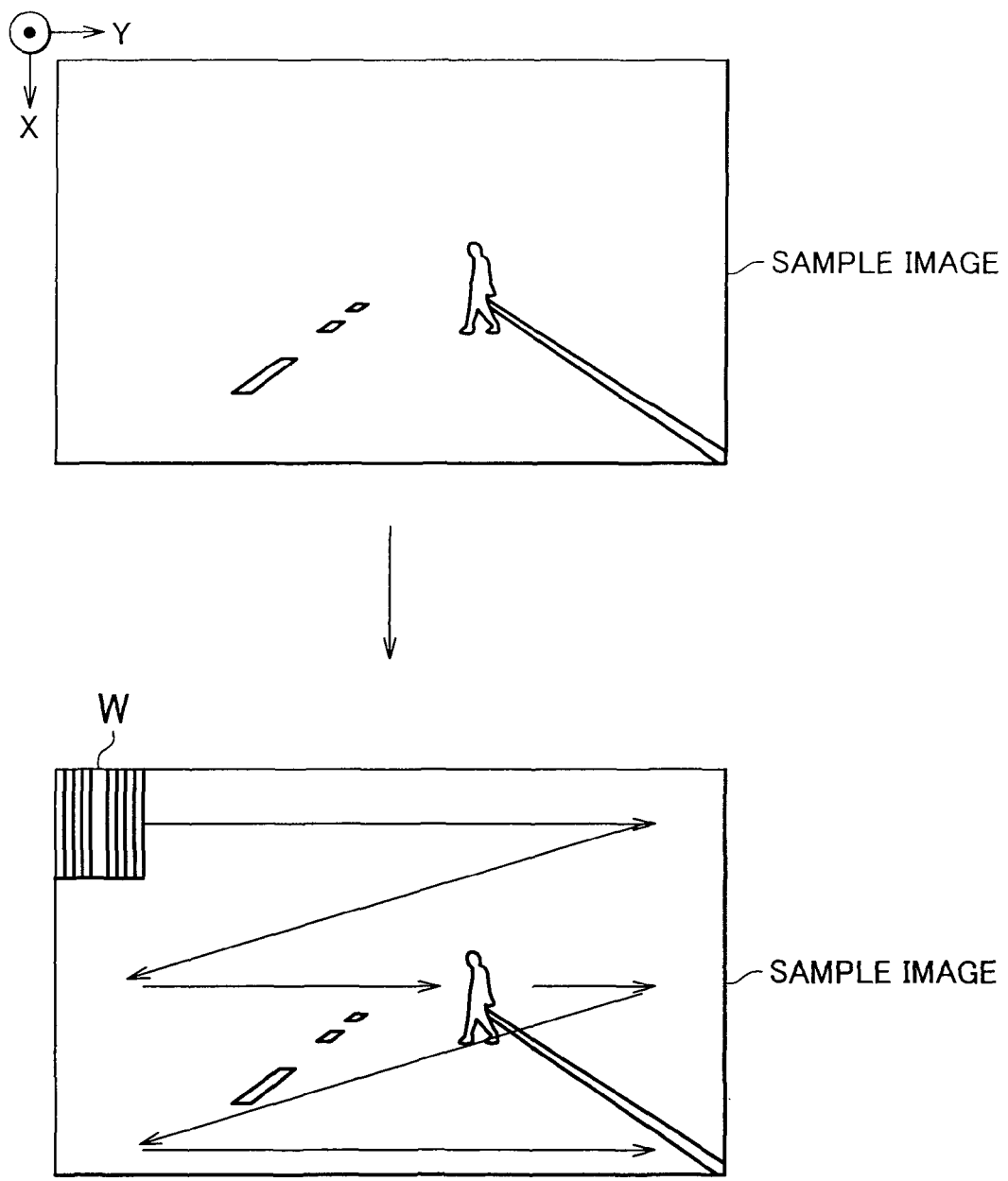
FIG. 3 is an explanatory view illustrating an instance where a sample image is searched in a search window.
Figure 4:
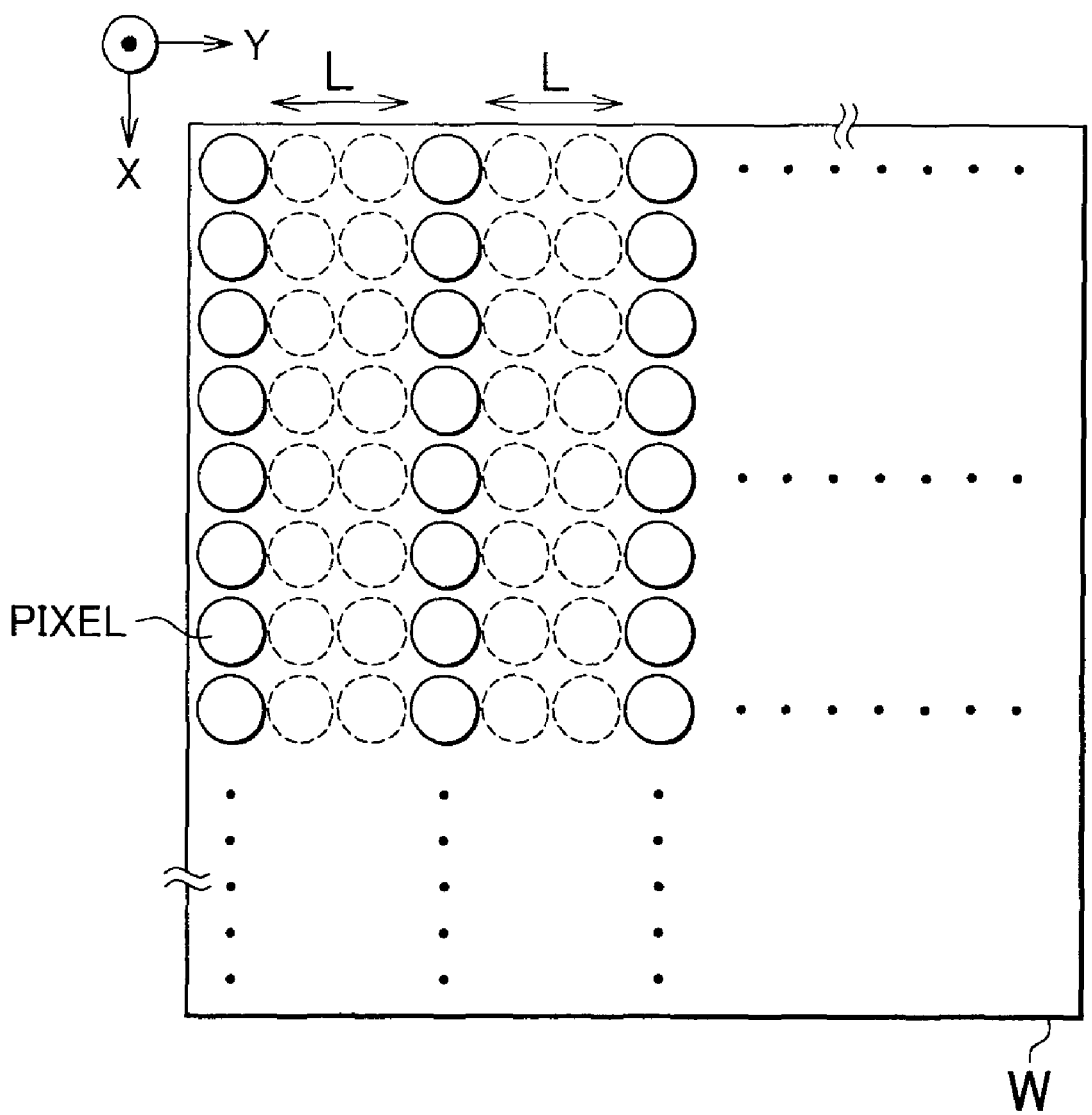
FIG. 4 is a view for explaining a pixel skipping amount in case of conducting a search in a search window.

A parameter determination process performed by the parameter determination unit 21 of the object detection apparatus shown in FIG. 1 will, now be described with reference to FIGS. 2 to 5. FIG. 2 is a flowchart for explaining a parameter determination process performed by the parameter determination unit 21. FIG. 3 is an explanatory view illustrating an instance where a sample image is searched in a search window W. FIG. 4 is a view for explaining a pixel skipping amount in case of conducting a search in the search window W. FIG. 5 is a view illustrating one example of a table produced for every sample image in case of performing the parameter determination process in the parameter determination unit 21.

In the parameter determination process, parameters to be used in the object detection process are determined and stored in the parameter storage unit 24 reduce a calculation load in the object detection process and detect an object at an increased speed. Here, the parameters include: (1) an average value of dictionary complexities; (2) an average value of maximum search pixel skipping amounts; and (3) an average value of maximum changing amounts of the search window size, Referring to FIG. 2, sample images m (in gray scale) (m=1 to M) are first taken by the camera unit 10 of the object detection apparatus and output to the image processing unit 20 (step S1). Here, each of the sample images m may include a pedestrian, each of which preferably shows small differences in size and lies in one plane. Complexity (N=1 to 20) of dictionaries to be used is set by the parameter determination unit 21 of the image processing unit 20 (step S2). The dictionaries are initially set to be most complex and the complexity is incrementally reduced. Subsequently, the size of the search window W (e.g., 32×64 pixels, 38×76 pixels, 46×92 pixels, 56×112 pixels, 64×128 pixels, 76×152 pixels and so forth) is set by the parameter determination unit 21 (step S3). The search window W is initially set smallest and then expanded in size step by step.

As illustrated in FIG. 3, the parameter determination unit 21 searches the entire region of the sample image m given by the camera unit 10 by using the search window W of the size set above and in a Y direction, i.e., a direction parallel to a road plane (step S4). In FIG. 3, the Y direction refers to a direction parallel to the road plane, i.e., an image row direction, whereas a X direction is a direction perpendicular to the road plane, i.e., an image column direction. Specifically, the sample image in the search window W is compared with a pre-set dictionary by scanning the dictionary on a pixel basis, the results of which are denoted as "1" meaning high similarity (object detected), or "0" meaning low similarity (object not detected). A histogram is produced by counting detection frequencies for the respective image rows (in a direction parallel to the road plane). In this regard, if the search window W and the dictionary differ from each other in size, the size of the image in the search window W is changed to fit into the size of the dictionary. Alternatively, dictionaries may be prepared corresponding to the sizes of the search window.

Subsequently, the parameter determination unit 21 performs a search pixel skipping amount calculation process (see FIGS. 7A and 7B) to determine a maximum search pixel skipping amount equal to the width of a normal distribution (step S5). FIG. 4 is a view for explaining a pixel skipping amount in the Y-axis direction while conducting a search, in which view "L" denotes the pixel skipping amount. In the example of FIG. 4, the pixel skipping amount L is two pixels.

Then, the parameter determination unit 21 determines whether the size of the search window W is greater than the image size, i.e., the full size of the sample images (step S6). If the size of the search window W is not greater than the image size (NO in step S6), the process returns to step S3 where the size of the search window W is increased by one step. The same processes as noted above (steps S3 to S6) are repeatedly performed until the size of the search window W exceeds the image size. By doing so, the image row histogram and the pixel skipping amount are calculated for each size of the search window W.

If the size of the search window W is greater than the image size (YES in step S6), a search window size changing amount determination process (see FIGS. 8A through 8C) is executed and a maximum changing amount of the search window W is determined to be equal to a detectable size range (step S7). Thereafter, it is determined whether the distribution of the histogram is normal (step S8). If the histogram is determined to be of a normal distribution (YES in step S8), the process returns to step S2 where the dictionary is set to be simpler. The same processes as noted above (steps S2 to S8) are repeatedly performed until the distribution histogram becomes abnormal. If the distribution of the histogram is not normal (NO in step S8), a dictionary complexity determination process (see FIGS. 6A through 6C) is executed to select a dictionary which is one step less complex than the current dictionary (step S9). This makes it possible to select the simplest dictionary in which the distribution of the histogram is normal.

By executing the processes of steps S2 to S9, it is possible to determine: (1) the dictionary complexity; (2) the maximum search pixel skipping amount for each of the dictionaries; and (3) the maximum size changing amount of the search window W for the sample images m. In the example illustrated in FIG. 5, the dictionary complexity N for the sample images m is equal to or greater than 5 where the histogram is of a normal distribution, and the maximum size changing amount of the search window W becomes 2.

Subsequently, the parameter determination unit 21 determines whether $m \geq M$ (step S10). If the condition m is not satisfied (NO in step S10), the process returns to step S1 and the same processes as noted above are executed repeatedly with respect to the sample images until the processes for M number of sample images are completed.

If the condition $m \geq M$ is satisfied (YES in step S10), the average values of the dictionary complexities, the maximum search pixel skipping amounts and the search window maximum size changing amounts for the sample images 1 to M are calculated and stored in the parameter storage unit 24 (step S11).

Figure 6A:
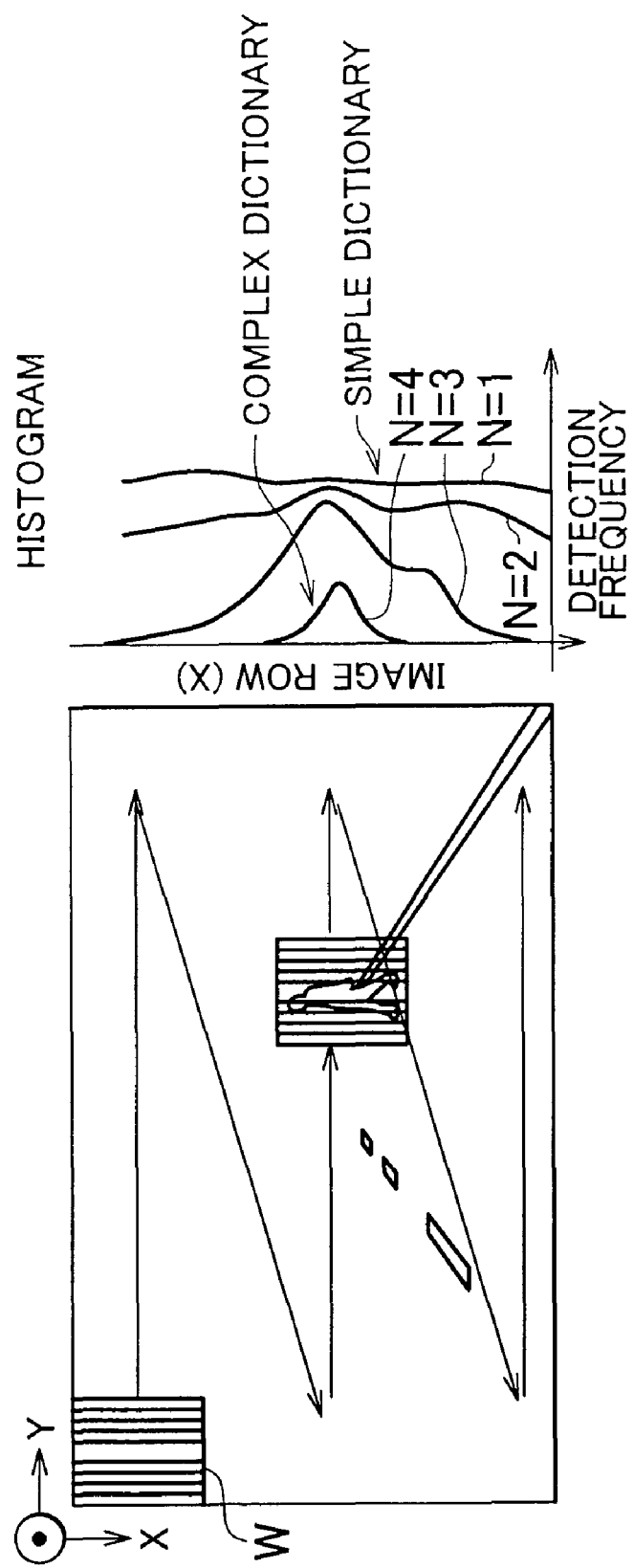
FIG. 6A is an explanatory view for explaining a dictionary complexity determination process.
Figure 6B:
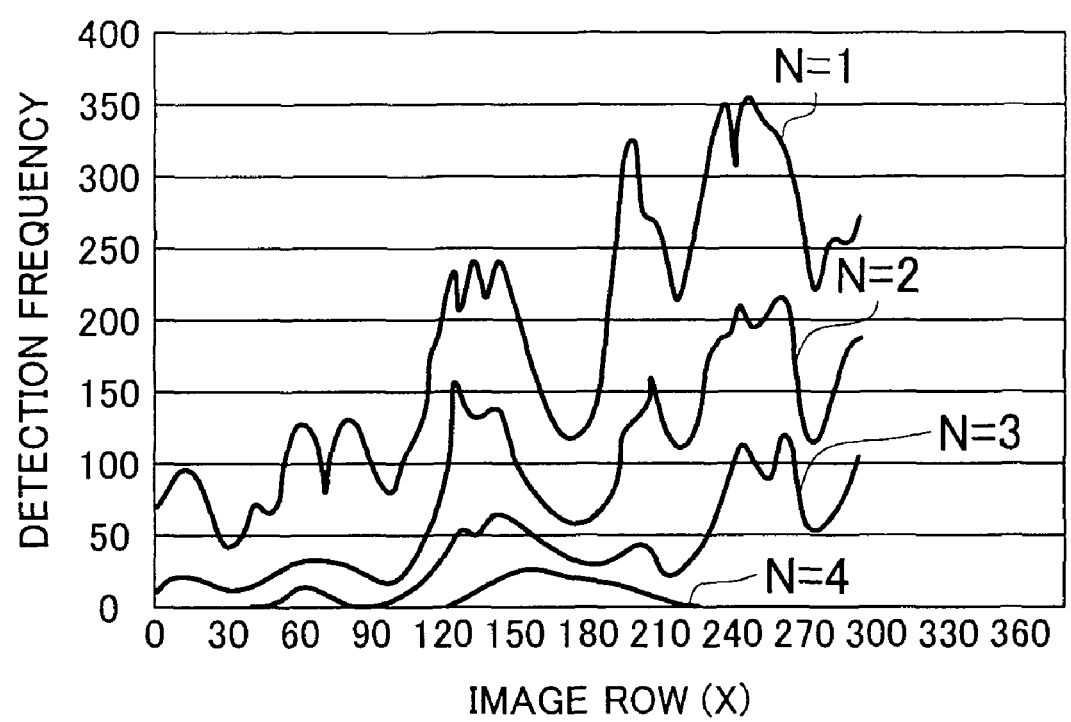
FIG. 6B is a view for explaining one example of actual histograms in each of dictionaries.
Figure 6C:
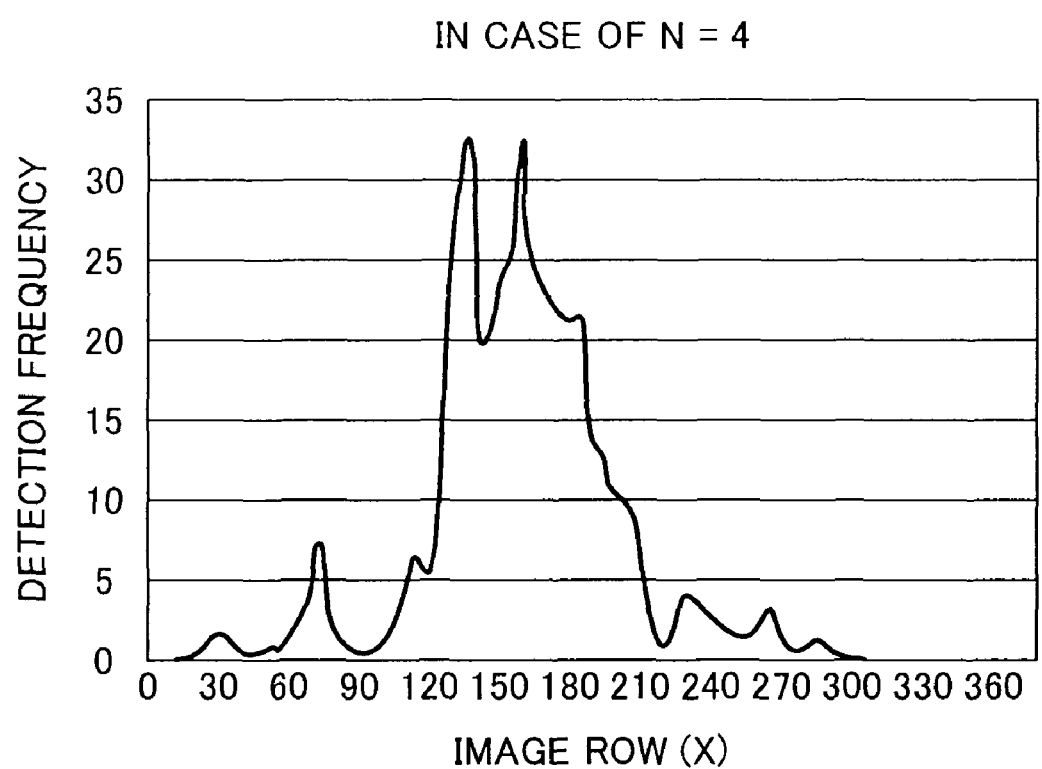
FIG. 6C is an enlarged view of a histogram having a normal distribution (dictionary complexity N is equal to 4) among the histograms illustrated in FIG. 6A.

A dictionary complexity determination process (step S9 in FIG. 2) included in the parameter determination process will be described in detail with reference to FIGS. 6A through 6C. FIG. 6A is an explanatory view for explaining the dictionary complexity determination process and shows one example of the sample images and one example of the histograms for the image rows of the corresponding sample image produced on a dictionary-by-dictionary basis (N=1 to 4). FIG. 6B is a view for explaining one example of actual histograms in each of dictionaries (N=1 to 4). FIG. 6C is an enlarged view of a histogram of a normal distribution (dictionary complexity N is equal to 4) among the histograms illustrated in FIG. 6A. In FIGS. 6B and 6C, the horizontal axis refers to image rows and the vertical axis denotes detection frequencies.

If the entire region of the sample image containing a detection target is searched with the search window W of a size, (e.g., 46×92 pixel) appropriate for the size of a pedestrian, a simplest dictionary that provides a normal distribution histogram among the histograms for the image rows (in the horizontal direction) produced on a dictionary-by-dictionary basis is determined as a dictionary complexity of the sample image m (step S9 noted above) by the processes of steps S2 to S8 shown in FIG. 2. In the example illustrated in FIGS. 6B and 6C, there is a need to use a dictionary having N=4 or higher in order to obtain a normal distribution histogram.

This makes it possible to select a simplest dictionary capable of detecting an object with an increased accuracy. By using this dictionary in the object detection process, the calculation time can be reduced.

Figure 7A:
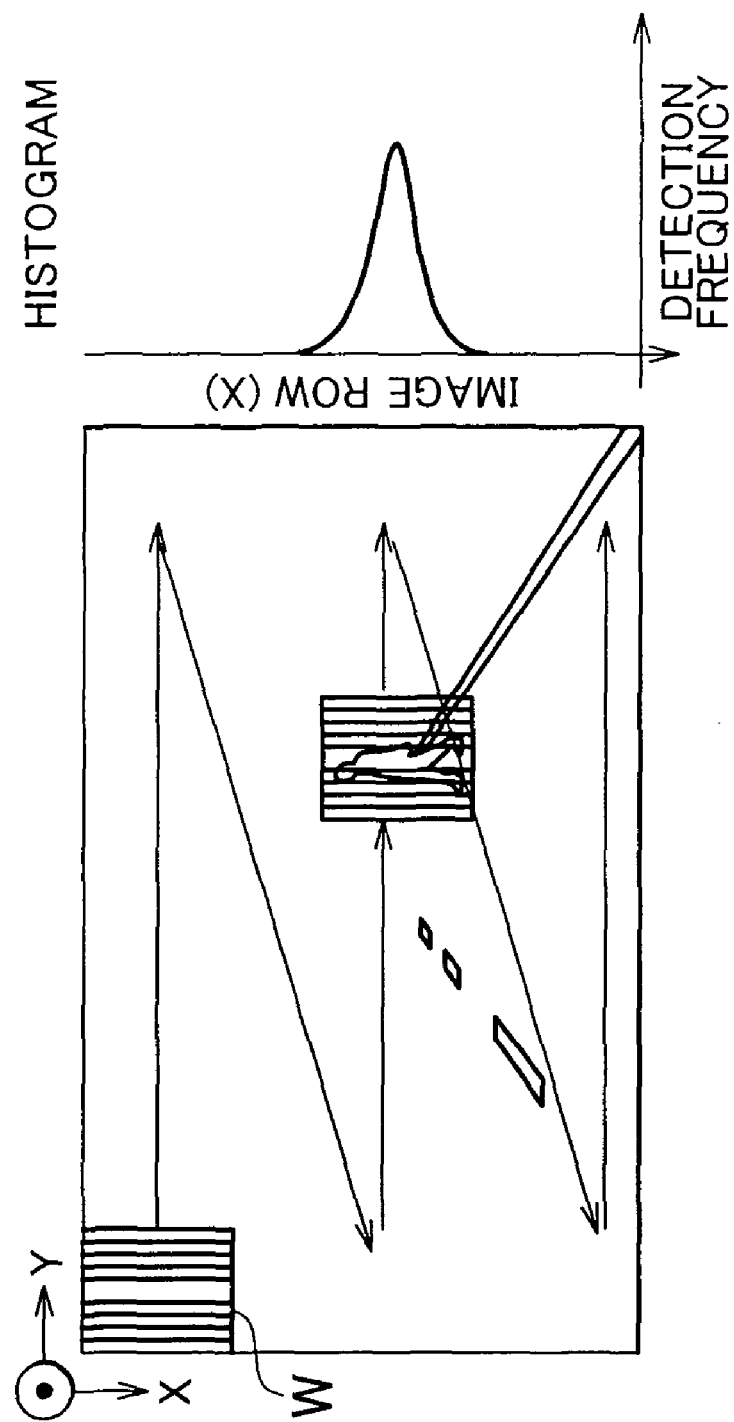
FIG. 7A is an explanatory view for explaining an in-search pixel skipping amount determination process.

A search pixel skipping amount determination process (step S5 in FIG. 2) included in the parameter determination process will be described in detail with reference to FIGS. 7A and 7B. FIG. 7A is an explanatory view for explaining the search pixel skipping amount determination process and shows one example of the sample images and one example of the histograms for the image rows of the corresponding sample image. FIG. 7B is a view for explaining a maximum search pixel skipping amount. In FIG. 7B, the horizontal axis refers to image rows and the vertical axis denotes detection frequencies.

If the entire region of the sample images m containing a detection target is searched with the search window W of a size appropriate for the size of a pedestrian (e.g., 46×92 pixels), a maximum search pixel skipping amount in the image column direction (Y direction) is determined for each of the dictionaries by the processes of steps S2 to S4 illustrated in FIG. 2, based on the histogram produced in terms of the image row direction (X direction) (step S5 noted above).

As can be seen in FIG. 7A, a normal distribution having a peak in the rows in which the detection target exists is generated in the histogram for the respective image rows. For example, as illustrated in FIG. 7B, the width of a peak in the normal distribution of the histogram may be determined as a maximum search pixel skipping amount that assures detectability. If the pixel skipping amount L is greater than the maximum search pixel skipping amount, detecting a pedestrian is infeasible.

Accordingly, this makes it possible to specify the search pixel skipping amount in or above which the detection target cannot be detected. Thus, by making the pixel skipping amount as great as possible but below the maximum search pixel skipping amount, the number of pixels to be searched in the object detection process may be reduced, thereby reducing the calculation time.

Figure 8A:
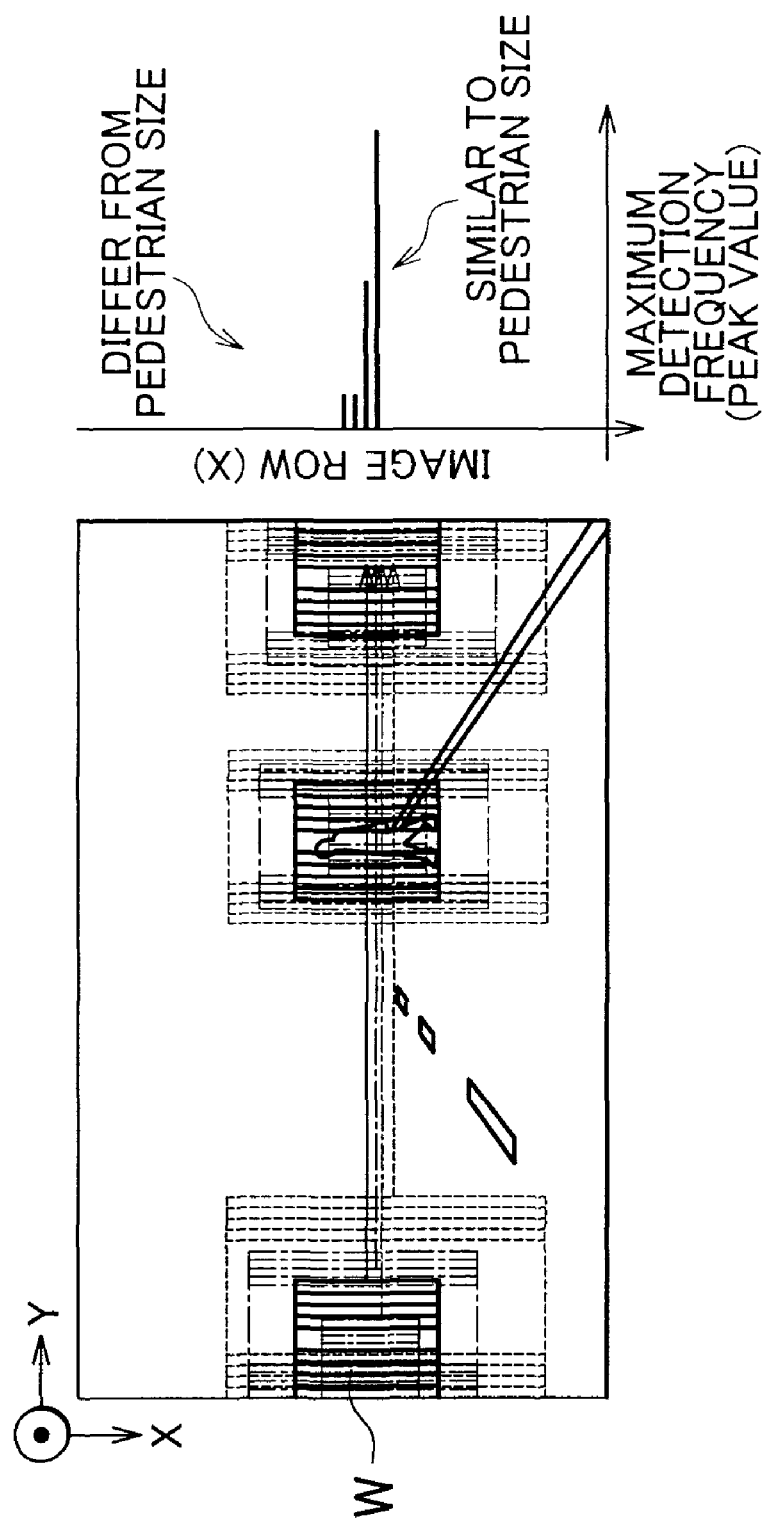
FIG. 8A is an explanatory view for explaining a window size changing amount determination process.
Figure 8B:
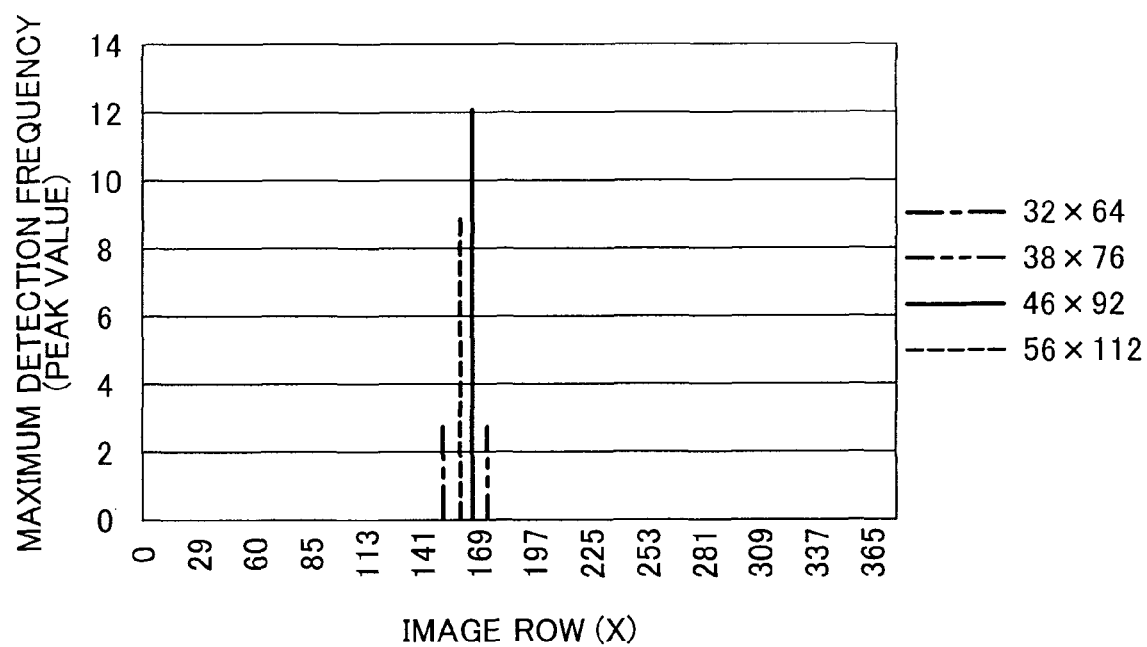
FIG. 8B is a view representing one example of actual maximum detection frequency for each search window size.
Figure 8C:
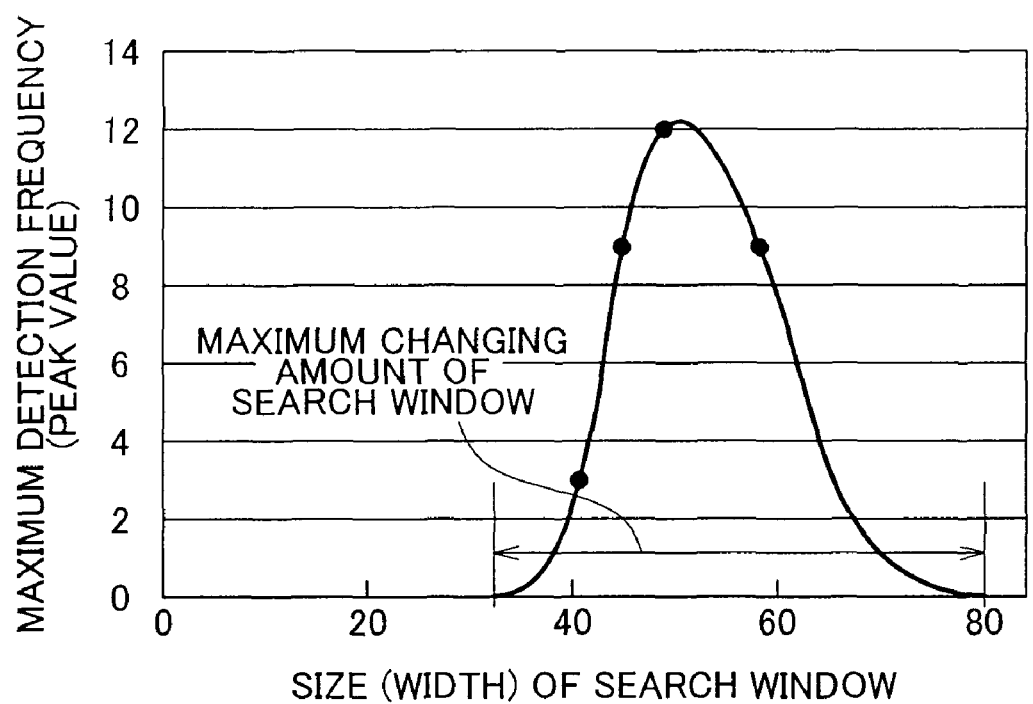
FIG. 8C is a graph for determining a maximum size changing amount.

A window size changing amount determination process (step S7 in FIG. 2) included in the parameter determination process will be described in detail with reference to FIGS. 8A through 8C. FIG. 8A is an explanatory view for explaining the window size changing amount determination process and schematically shows one example of the sample image and the maximum detection frequency for the image rows of the corresponding sample image in each size of the search window W. FIG. 8B is a view representing one example of actual maximum detection frequency for each search window size, in which the horizontal axis refers to image rows and the vertical axis denotes detection frequency. FIG. 8C is a graph for determining a maximum size changing amount, in which the horizontal axis refers to a size (width) of the search window W and the vertical axis denotes maximum detection frequency.

If the sample images m, containing detection targets (provided that individual detection targets show a little difference in size and lie in a plane), are searched while changing the size of the search window, the detection frequencies for the image rows (in the X-axis direction) are calculated by the processes of steps S2 to S6 illustrated in FIG. 2. As illustrated in FIGS. 8A and 8B, the maximum detection frequencies are attained in the rows where a pedestrian is present. In the window size changing amount determination process, a graph as shown in FIG. 8C is produced such that a horizontal axis represents the search window size and a vertical axis stands for the maximum detection frequency for each size of the search window. The width of a peak of the graph (a detectable size extent) is determined as a maximum size changing amount that assures detectability. This is because a detection failure may occur if the size changing amount is greater than the width of the peak.

This makes it possible to specify the search window size changing amount in or above which the detection target cannot be detected. Thus, by making the size changing amount as great as possible but below the maximum size changing amount, the search frequencies and the calculation time of the object detection process described below may be reduced.

Alternatively, the parameter determination process may be executed by other devices (a personal computer, and the like) that store the resultant parameters in the parameter storage unit 24. As a further alternative, the parameters may be stored in the parameter storage unit 24 when shipped from a factory.

Figure 9A:
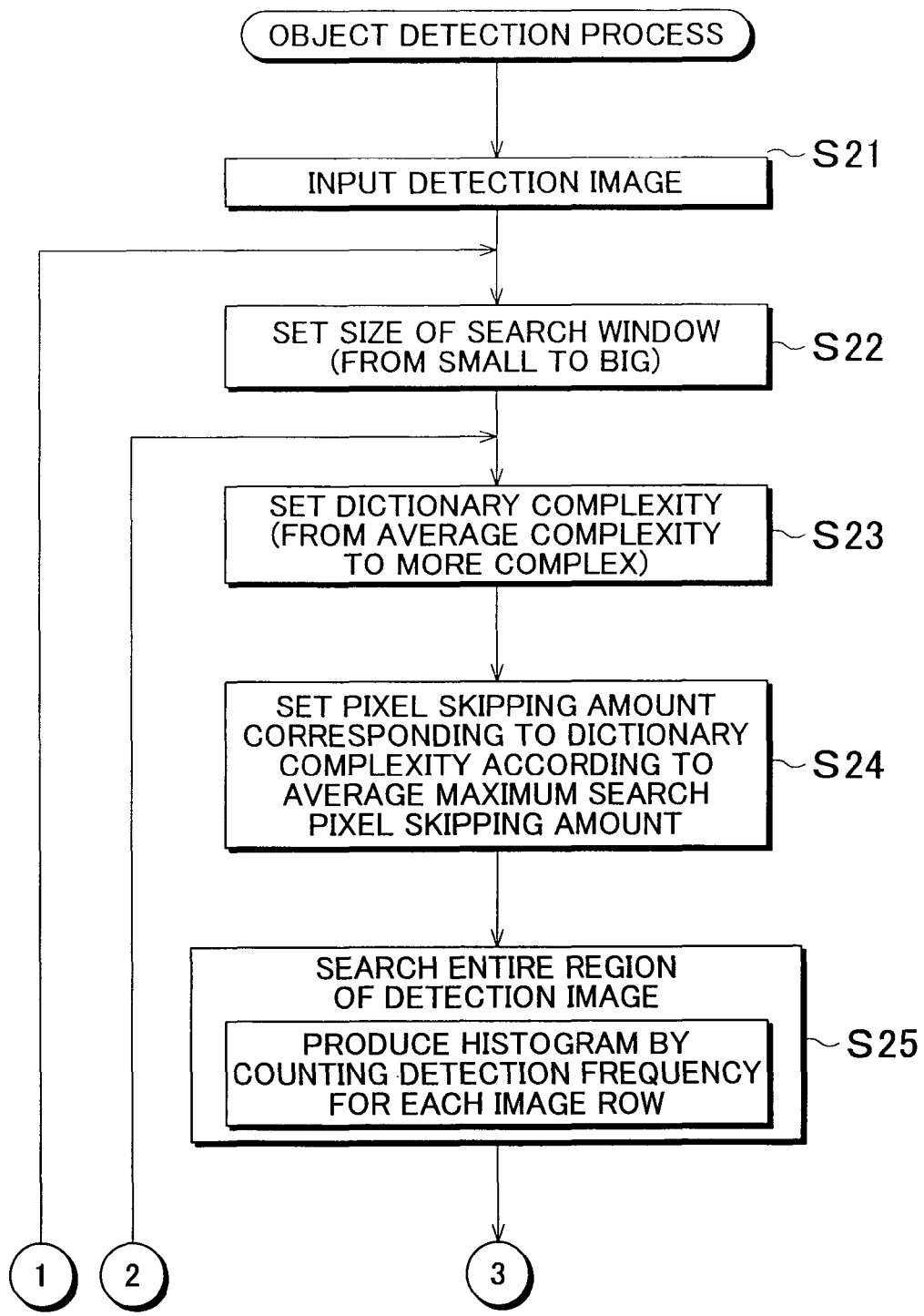
FIGS. 9A and 9B are a flowchart for explaining an object detection process.
Figure 9B:
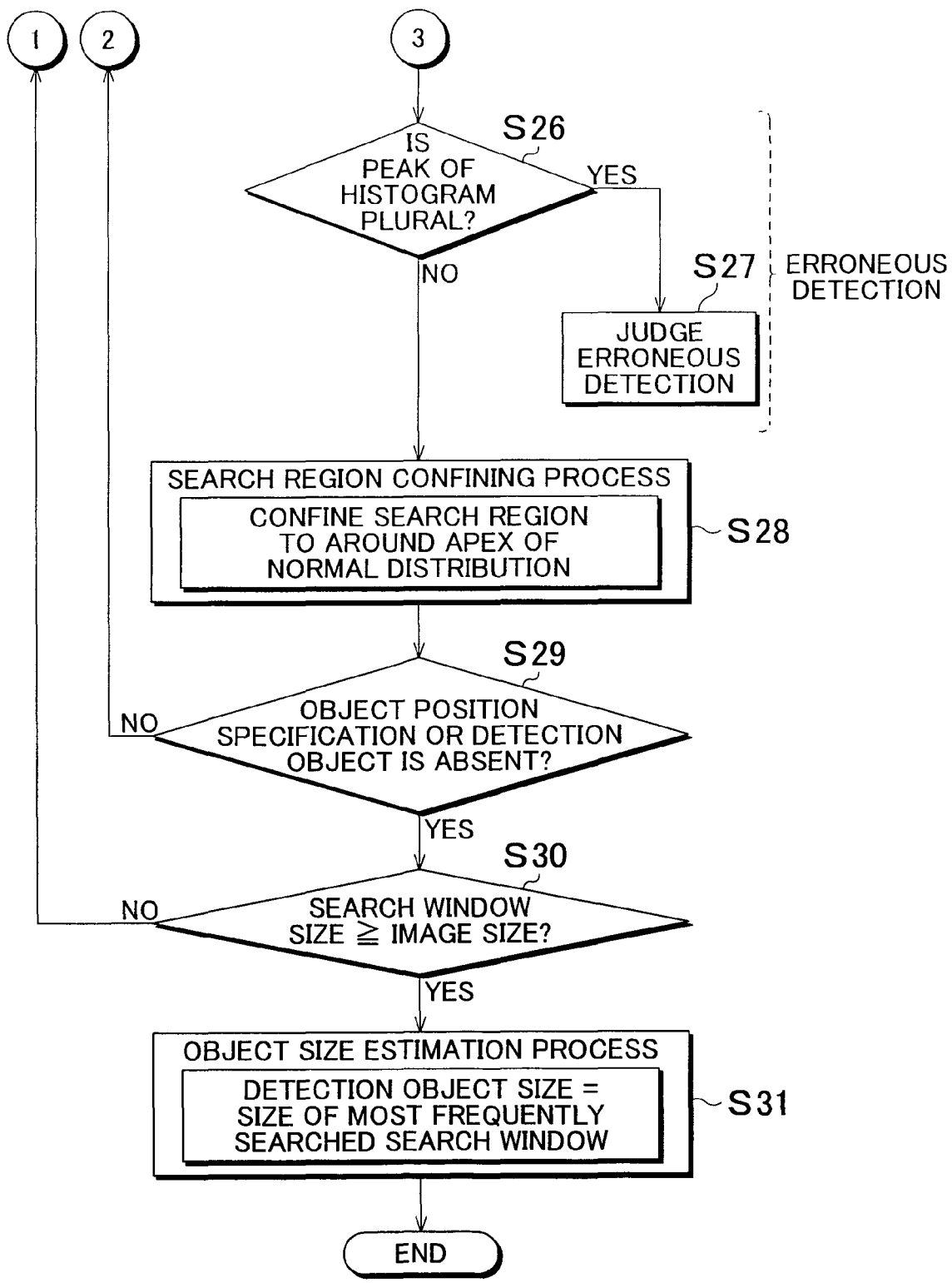

FIGS. 9A and 9B is a flowchart for explaining the object detection process executed in the object detection unit 22 of the object detection apparatus 1 configured as above. In the object detection process, a calculation load required for object detection is reduced by using an average dictionary complexity, an average maximum search pixel skipping amount of the search window W and a maximum size changing amount of the search window W, all of which are stored in the parameter storage unit 24.

Referring to FIG. 9A, a detection image (gray-scale image) is first extracted from the camera unit 10 of the object detection apparatus 1 (step S21). The display controller 25 controls the display unit 30 to display the detection image thus input.

The object detection unit 22 sets the size of the search window W (step S22). The size of the search window W is initially smallest and then is getting expanded step by step in a size changing amount L' (e.g., size changing amount L'=one half of the average maximum size changing amount) based on the average maximum size changing amount stored in the parameter storage unit 24.

Furthermore, the object detection unit 22 sets an average complexity of the dictionaries stored in the parameter storage unit 24 (step S23) and, in correspondence to the dictionary complexity, also sets the pixel skipping amount L (e.g., pixel skipping amount L=one half of the average maximum search pixel skipping amount) based on the average maximum search pixel skipping amount stored in the parameter storage unit 24 (step S24).

In the search window W of the pre-set size and in the pre-set pixel skipping amount, the object detection unit 22 searches the entire region of the detection image extracted from the camera unit 10 (step S25). More specifically, the object detection unit 22 produces a histogram by comparing every object pixel of the detection image in the search window with the pre-set dictionaries, the results of which are labeled as "1" meaning high similarity (object detected) or "0" meaning low similarity (object not detected), and counting the detection frequencies of the "1" for each of the image rows. As set forth earlier, if the search window W and the dictionaries differ in size, the image size in the search window is changed to fit the size of the dictionaries. Alternatively, dictionaries of different size may be produced in accordance with the size of the search window W.

The object detection unit 22 determines whether the histogram thus produced has a plural number of peaks (step S26). If the histogram has a plural number of peaks (YES in step S26), namely, if the histogram has a multimodal distribution, it is determined that erroneous detection has occurred (step S27). In case the object detection unit 22 detects erroneous detection, the display controller 25 may allow the display unit 30 to display in that sense.

On the other hand, if the histogram does not have a plural number of peaks (NO in step S26), namely, if the histogram has a unimodal distribution, a search region confining process (see FIGS. 11A and 11B) is executed to thereby confine the search region to around an apex of the normal distribution (step S28). More specifically, by confining the search region to around an apex of the normal distribution, an image search is executed in a pixel skipping amount smaller than the pixel skipping amount L set in step S24 and with a dictionary more complex than that set in step S23, thereby specifying the position of a pedestrian as a detected object.

Thereafter, the object detection unit 22 determines whether the position of a detected object is identified or whether the detected object itself is present or not (step S29). If the position of the detected object is not obtained or the detected object itself is determined not to be absent (NO in step S29 is "No"), the process returns to step S23 where the dictionary is set more complex by one step. Then, the same processes as in steps S23 to S28 are executed. A detection rate of the pedestrian as the detected object may be increased by setting the dictionary for comparison more complex.

On the other hand, if the position of the detected object is determined or the detected object is determined to be absent (YES in step 29), it is determined whether the size of the search window is equal to or greater than the image size (the full size of the detection image) (step S30). If the size of the search window is neither equal to nor greater than the image size (the full size of the detection image), namely, if the answer in step S30 is "NO", the process returns to step S22 where the size of the search window W is increased by the size changing amount L'. Then, the same processes as in steps S22 to S30 are repeatedly executed until the size of the search window becomes equal to or greater than the image size (the full size of the detection image).

If the size of the search window is not less than the image size (the full size of the detection image), namely, if the answer in step S30 is "YES", an object size estimation process (see FIGS. 12A through 12C) is performed to estimate that the size of the pedestrian is equal to the size of the search window most frequently detected (step S31). The display controller 25 allows the display unit 30 to display the detection object specified in step S28 in an identifiable manner by indicating the estimated size of the pedestrian with a rectangular frame in the detection image currently displayed on the display unit 30. The user can easily identify that the detected object is a pedestrian.

Figure 10A:
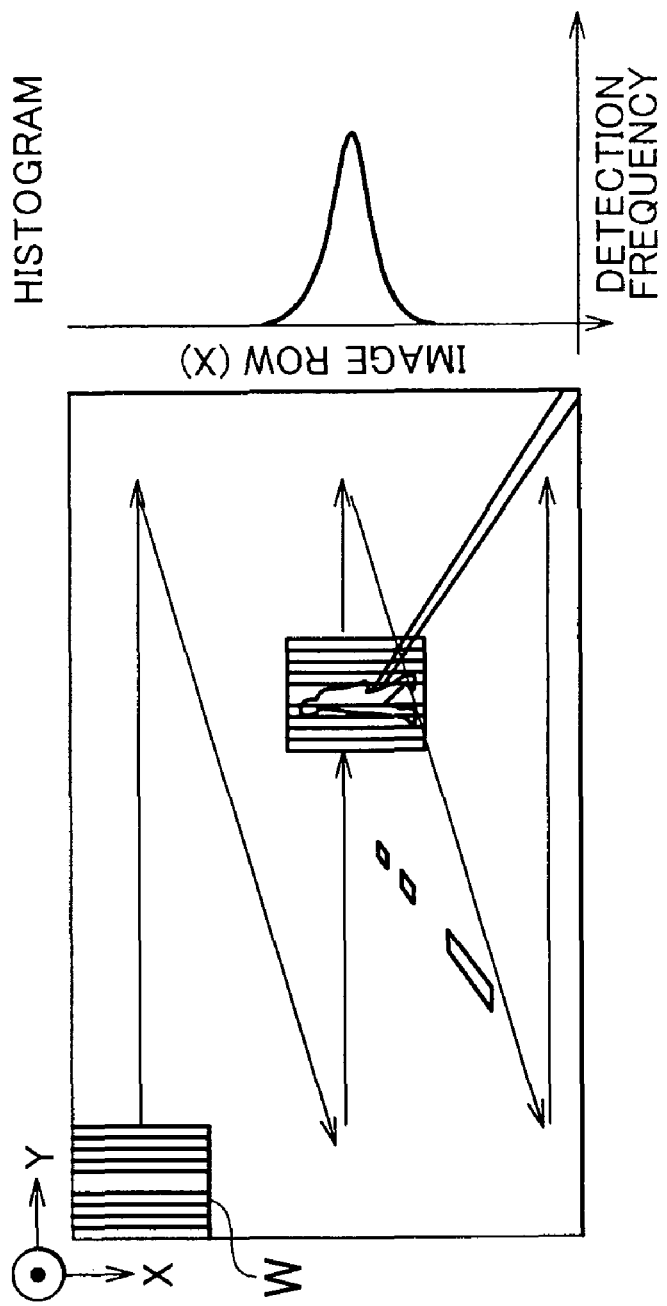
FIG. 10A is an explanatory view for explaining an erroneous-detection determination process.
Figure 10B:
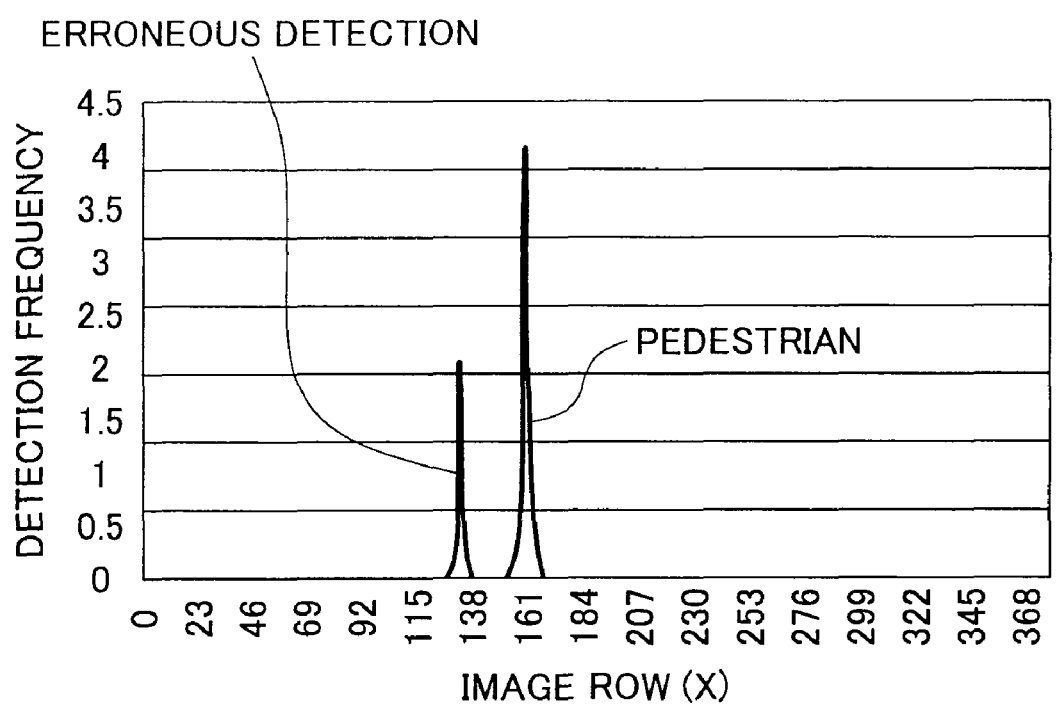
FIG. 10B is a view illustrating one example of a histogram in case of erroneous detection.

An erroneous-detection determination process (steps S26 and S27 in FIG. 9B) included in the object detection process will be described in detail with reference to FIGS. 10A and 10B. FIG. 10A is an explanatory view for explaining the erroneous-detection determination process and schematically shows one example of the detection images and the histogram for the image rows of the corresponding detection image. FIG. 10B is a view representing one example of the histograms in case of erroneous detection, in which the horizontal axis refers to image rows and the vertical axis denotes detection frequencies.

A histogram for the image rows (in the horizontal direction) in the event that the entire region of the detection image is searched while changing the size of the search window is produced by the processes of steps S22 to S25 shown in FIG. 9A. In the erroneous-detection determination process, the shape of the histogram thus produced is classified and a determination of erroneous detection is rendered if a plural number of peaks exist in the histogram (if there exists a multimodal distribution) (steps S26).

If a pedestrian is detected correctly, the histogram has the shape of a normal distribution (unimodal distribution) as illustrated in FIG. 10A. This is because a pedestrian stands on a road and because there may be no case that a pedestrian of the same size is placed in different height (rows) in the image. If a plural number of peaks exist in the histogram as illustrated in FIG. 10B (in case of a multimodal distribution), a determination of erroneous detection may be made due to the presence of a peak other than the peak representing a pedestrian.

Figure 11B:
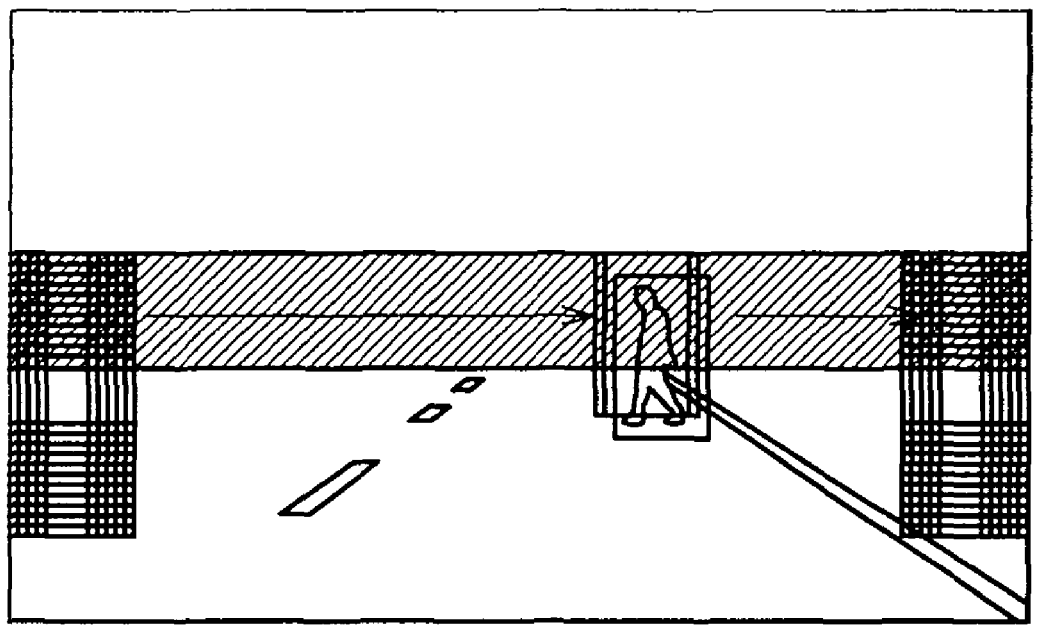
FIG. 11B is a view for explaining a search of a detection image.

A search region confining process (step S28 in FIG. 9B) included in the object detection process will be described in detail with reference to FIGS. 11A and 11B. FIG. 11A is a view for explaining the search region confining process and schematically shows one example of the detection images and the histogram for the image rows of the corresponding detection image. FIG. 11B is a view for explaining a search of the detection image.

If it is determined in step S26 shown in FIG. 9B that the histogram is of a shape of a normal distribution (unimodal distribution), a normal distribution having a peak in the rows in which a pedestrian exists is generated in the histogram. In the search region confining process, the search region is confined to around an apex of the normal distribution and a thorough search is performed in a pixel skipping amount smaller than the pixel skipping amount set in step S24 and with a dictionary more complex than that set in step S23, thereby specifying the position of a pedestrian as a detection object.

Figure 12A:
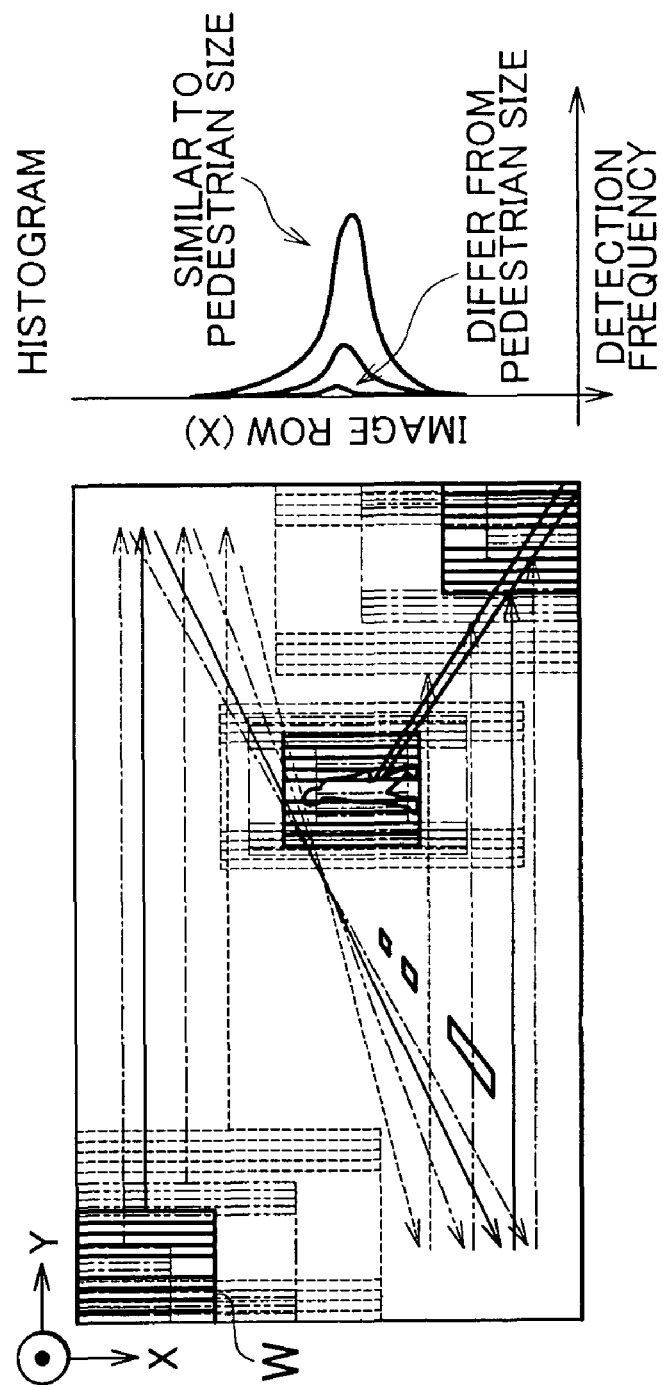
FIG. 12A is a view for explaining an object size estimation process.
Figure 12B:
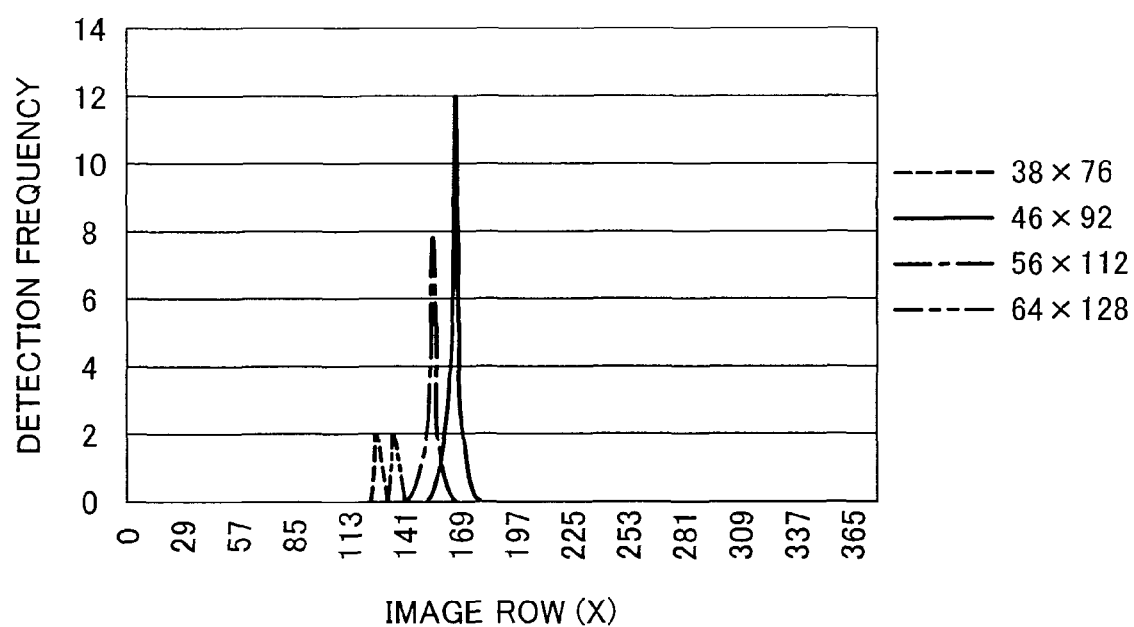
FIG. 12B is a view illustrating one example of actual maximum detection frequency for each search window size.
Figure 12C:
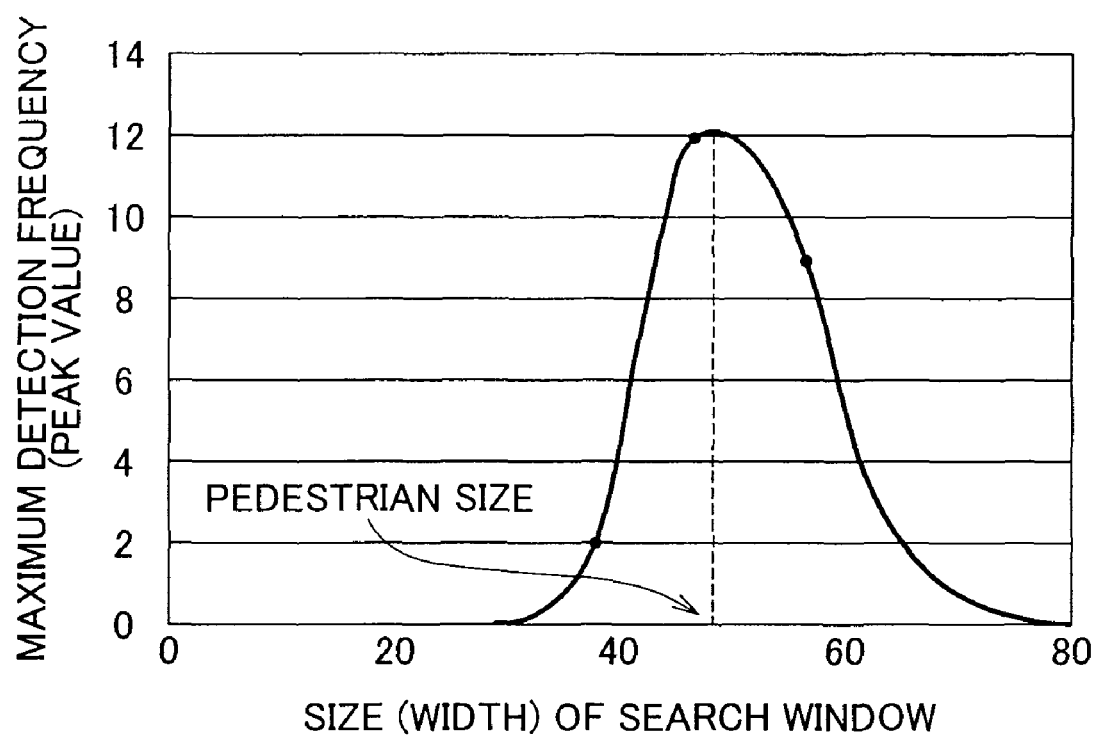
FIG. 12C is a graph for determining an object size.

An object size estimation process (step 31 in FIG. 9B) included in the object detection process will be described in detail with reference to FIGS. 12A through 12C. FIG. 12A is a view for explaining the object size estimation process and schematically shows one example of the detection images and the histogram of each size of the search window for the image rows of the corresponding detection image. FIG. 12B is a view illustrating one example of actual maximum detection frequency for each search window size, in which the horizontal axis refers to image rows and the vertical axis denotes maximum detection frequency. FIG. 12C is a graph for determining an object size, in which the horizontal axis refers to the size (width) of the search window and the vertical axis denotes maximum detection frequency.

A histogram for the image rows (in the horizontal direction) in the event that the entire region of the detection image is searched while changing the size of the search window is produced by the processes of steps S22 to S30 shown in FIGS. 9A and 9B. As set forth above, a normal distribution having a peak near the rows in which a pedestrian exists is generated in the histogram. As can be seen in FIG. 12A, a large peak is generated in case of the search window W having a size similar to that of the pedestrian, whereas a small peak is generated in case of the search window W whose size differs from that of the pedestrian.

In the object size estimation process, the histograms for the search windows of different sizes are compared with one another and the size of the search window whose peak value (maximum detection frequency) is the greatest is estimated to be the size of the pedestrian (step S31 in FIG. 9B). For instance, in the example illustrated in FIG. 12B, the size of 46×92 pixels of the search window is estimated to be the size of the pedestrian.

To estimate the size of the pedestrian more accurately, a graph is produced, the horizontal axis of which represents a search window size (width) and the vertical axis of which represents a peak value of histograms (maximum detection frequency), and then the search window size (width) having a greatest peak value in the graph to be the size of the pedestrian is estimated.

As described above, in accordance with the present embodiment, the object detection apparatus 1 performs the object detection process in such a manner that a histogram is produced by searching the entire region of an image of the road on which the vehicle is traveling with a search window, comparing the image in the search window with dictionaries modeling a pedestrian and counting detection frequencies in a direction parallel to a road plane and a pedestrian is detected by detecting a unimodal distribution from the shape of the histogram thus produced. Thus, an object can be detected by producing a histogram in a single direction and analyzing the distribution thereof. This makes it possible to reduce a calculation load and perform object detection at an increased speed.

Furthermore, in the object detection process, an erroneous detection is determined if the histogram has a multimodal distribution. This makes it possible easily detect an erroneous detection in case the histogram is not of a unimodal distribution. Thus, it is possible to avoid any use of identification results including the erroneous detection. Moreover, suitability of parameters such as dictionaries, searches and the like can be determined based on the frequencies of the erroneous detection.

Furthermore, in the object detection process, a histogram for each search window size is produced by searching a detection image while the size of a search window being changed and the size of a pedestrian is estimated based on the maximum detection frequency of the histogram for each search window size. This makes it possible to estimate the size of a pedestrian in a simple manner. Moreover, it is possible to highlight a pedestrian by enclosing the same with a frame of suitable size when a pickup image is displayed in the display unit 30. In addition, if there is no deviation in the size of a pedestrian, it is possible to estimate the distance to the pedestrian.

Furthermore, in the parameter determination process, the object detection apparatus 1 produces histograms on a dictionary-by-dictionary basis by searching a plurality of sample images containing a detection object with a search window, comparing the sample images in the search window with a plurality of dictionaries of different resolutions, and counting a detection frequency in a direction parallel to a road plane. Lowest resolutions are determined among resolutions of the dictionaries that allow the histograms to have a unimodal distribution and an average resolution value is calculated by averaging the lowest resolutions derived with respect to the plurality of sample images. In the object detection process, the average resolution value is used as a resolution of the dictionaries, thereby making it possible to select a simplest dictionary that can detect an object with an increased accuracy. This dictionary in the object detection process allows calculation time reduction.

Furthermore, in the parameter determination process, histograms are produced by searching a plurality of sample images containing a detection object with a search window, comparing the sample images in the search window with dictionaries, and counting a detection frequency in a direction parallel to a road plane. Maximum pixel skipping amount in a direction perpendicular to a road plane is calculated based on a shape of the histograms and an average maximum pixel skipping value is calculated by averaging the maximum pixel skipping amounts derived for the plurality of sample images. In the object detection process, a pixel skipping amount is set by adopting the average maximum pixel skipping value as an upper limit. Thus, it is possible to specify a search pixel skipping amount in or above which the detection target cannot be detected. By making the pixel skipping amount as great as possible but below the maximum search pixel skipping amount, it becomes possible in the object detection process to reduce the number of pixels to be searched and to shorten the calculation time.

Furthermore, in the parameter determination process, histograms are produced by searching a plurality of sample images containing the object to be detected while the size of a search window is changed, comparing the sample images in the search window with dictionaries and counting a detection frequency in a direction parallel to a road plane. Maximum size changing amount of the search window is then calculated based on maximum detection frequency in the histogram for each size of the search window and an average maximum size changing value is calculated by averaging the maximum size changing amounts derived for the plurality of sample images. In the object detection process, a search window size changing amount is set by adopting the average maximum size changing value as an upper limit. Thus, it is possible to specify a maximum search window size changing amount in or above which the detection target cannot be detected. By making the search window size changing amount as great as possible but below the maximum search window size changing amount, the number of searches in the object detection process may be reduced, which thereby reduces the calculation time.

Although classifiers are used as the dictionaries modeling a pedestrian in the embodiment described above, the present invention is not limited thereto. Alternatively, it may be possible to use a pattern plate employed in a pattern matching process as the dictionaries for modeling a pedestrian.

Although the foregoing description pertains to when the object is a pedestrian, the present invention is not limited thereto. Alternatively, the object may be a vehicle, a road structure or other objects, in which case dictionaries modeling these objects can be used.

Although the entire region of a detection image is searched in the embodiment described above, the present invention is not limited thereto. Alternatively, it may be possible to search only the region where a detection object is most likely to exist.

The present invention also provides a system or an apparatus with a recording medium that stores program codes of software for implementing functions of the above described object detection apparatus and by allowing a computer (including a CPU, an MPU or a DSP) of the system or apparatus to execute the program codes stored in the recording medium. In this case, the program codes themselves read out from the recording medium serve to implement the functions of the above described object detection apparatus. Accordingly, the program codes and the recording medium storing them are included in the present invention. An optical recording medium, a magnetic recording medium, a magneto-optical recording medium and a semiconductor recording medium, such as, for example, a floppy disk, a hard disk, an optical disk, a magneto-optical disk, a CD-ROM, a CD-R, a DVD, a magnetic tape, a non-volatile memory, a ROM may be used as the recording medium for storing the program codes.

It is apparent to a skilled person in the art that the present invention covers the implementation of functions of the aforementioned object detection apparatus through an operating system or the like of a computer to perform a part of actual processes or the whole processes based on a command of the program codes, as well as the implementation of functions of the above-described object detection apparatus by executing the program codes read out by a computer.

Moreover, it is needless to say that the present invention covers the implementation of functions of the above-described object detection apparatus by inputting the program codes read out by a computer to a memory of a function extension board inserted into the computer or a function extension unit connected to the computer and then allowing a CPU or the like of the function extension board or the function extension unit to perform a part of actual processes or the whole processes based on a command of the program codes.

While the invention has been shown and described with respect to the example embodiments, it will be understood by those skilled in the art that various changes and modifications may be made without departing from the scope of the invention as defined in the following claims.

The invention claimed is:

1. An object detection apparatus that detects an object from an image obtained by taking a picture of a road before a vehicle in the direction of travel, the object detection apparatus comprising:
   a camera unit that captures and inputs the image of the road before the vehicle;
   a dictionary modeling the object;
   a search unit that searches the image with a search window;
   a histogram production unit that produces a histogram by comparing the image in the search window with the dictionary and counting a detection frequency in a direction parallel to a road plane; and
   a detection unit that detects the object by detecting a unimodal distribution from the histogram.

2. The object detection apparatus according to claim 1, further comprising a determination unit that determines the detection of the object is erroneous if the histogram has a multimodal distribution.

3. The object detection apparatus according to claim 1, wherein:
   the search unit searches the image while a size of the search window is changed;
   the histogram production unit produces the histogram for each size of the search window; and
   the object detection apparatus further comprises an object size estimation unit that estimates a size of the object based on a maximum detection frequency in the histogram for each size of the search window W produced by the histogram production unit.

4. The object detection apparatus according to claim 3, wherein the object size estimation unit estimates that the size of the search window whose maximum detection frequency is the greatest is a size of the object.

5. The object detection apparatus according to claim 1, wherein the dictionary has a resolution determined by searching a plurality of sample images containing the object with the search window, comparing the sample images in the search window with a plurality of dictionaries of different resolutions, counting a detection frequency in a direction parallel to a road plane to thereby produce histograms on a dictionary-by-dictionary basis, determining lowest resolutions among resolutions of the dictionaries that allow the histograms to have a unimodal distribution, and averaging the lowest resolutions derived with respect to the plurality of sample images.

6. The object detection apparatus according to claim 1, wherein the search unit searches the image with the search window in a predetermined pixel skipping amount, the predetermined pixel skipping amount is determined by searching a plurality of sample images containing the object with the search window, comparing the sample images in the search window with the dictionary, counting a detection frequency in a direction parallel to a road plane to thereby produce histograms, calculating maximum pixel skipping amounts in a direction perpendicular to a road plane based on a shape of the histograms, and averaging the maximum pixel skipping amounts derived for the plurality of sample images to obtain an average maximum pixel skipping value, which serves as an upper limit of the predetermined pixel skipping amount.

7. The object detection apparatus according to claim 6, wherein the maximum pixel skipping amount is a width of a peak in the normal distribution of the histogram.

8. The object detection apparatus according to claim 1, wherein the search unit searches the image in a predetermined search window size changing amount, the predetermined search window size changing amount being determined by searching a plurality of sample images m containing the object while a size of the search window is changed, comparing the sample images in the search window with the dictionary, counting a detection frequency in a direction parallel to a road plane to thereby produce histograms, calculating maximum search window size changing amount based on a maximum detection frequency in the histograms for each search window size, and averaging the maximum search window size changing amounts derived for the plurality of sample images m to obtain an average maximum search window size changing value that serves as an upper limit of the predetermined search window size changing amount.

9. The object detection apparatus according to claim 8, wherein a graph is produced such that one axis represents the size of the search window and the other axis represents the maximum detection frequency, and a width of a peak of the graph is determined as the maximum size changing amount.

10. The object detection apparatus according to claim 1, wherein the detection unit confines a search region to around an apex of the normal distribution, and specifies a position of the object.

11. The object detection apparatus according to claim 1, wherein if the search window and the dictionary differ in size, the size of the search window is changed to fit the size of the dictionary.

12. An object detecting method that detects an object from an image acquired by taking a picture of a road before a vehicle in the direction of travel, the method comprising:

acquiring an image of the road before the vehicle in the direction of travel and inputting the image;

searching the acquired image with a search window;

producing a histogram by comparing the image in the search window with a dictionary modeling the object and counting a detection frequency in a direction parallel to a road plane; and detecting the object by detecting a unimodal distribution from the histogram.

13. A program storage device comprising;

a recording medium that is readable by an object detection apparatus for object detection that detects an object from an image acquired by taking a picture of a road before a vehicle in the direction of travel; and a program code that is stored on the recording medium, and allows the object detection apparatus to function as:

a search unit that searches the image acquired by taking the front view picture of the road with a search window;

a histogram production unit that produces a histogram by comparing the image in the search window with a dictionary modeling the detection object and counting a detection frequency in a direction parallel to a road plane; and a detection unit that detects the detection object by detecting a unimodal distribution from the histogram.

* * * * *